(12) United States Patent
Kuwajima et al.

(10) Patent No.: US 7,847,194 B2
(45) Date of Patent: Dec. 7, 2010

(54) OPENING AND CLOSING DEVICE

(75) Inventors: Hideki Kuwajima, Kyoto (JP);
Yasuchika Kudo, Fukui (JP)

(73) Assignee: Panasonic Corporation, Osaka (JP)

( * ) Notice: Subject to any disclaimer, the term of this patent is extended or adjusted under 35 U.S.C. 154(b) by 516 days.

(21) Appl. No.: 11/947,978

(22) Filed: Nov. 30, 2007

(65) Prior Publication Data
US 2008/0128156 A1  Jun. 5, 2008

(30) Foreign Application Priority Data
Dec. 1, 2006  (JP) ............................. 2006-325184

(51) Int. Cl.
*H01B 17/16* (2006.01)
(52) U.S. Cl. ................... 174/161 R; 174/520; 174/135; 361/679.01; 379/433.13; 16/330; 16/326
(58) Field of Classification Search ............ 174/50, 174/520, 17 R, 559, 161 R; 16/324, 330, 16/326, 303, 331; 379/433.05, 433.01, 433.13; 361/600, 679.01, 679.02, 679.04, 679.27, 361/679.28, 678.58
See application file for complete search history.

(56) References Cited

U.S. PATENT DOCUMENTS

| 5,109,571 | A | * | 5/1992 | Ohshima et al. ............... 16/330 |
| 6,886,221 | B2 |   | 5/2005 | Minami et al. |
| 7,007,345 | B2 | * | 3/2006 | Nakase et al. ................. 16/326 |
| 7,117,562 | B2 | * | 10/2006 | Zuo et al. ..................... 16/303 |
| 7,151,226 | B2 |   | 12/2006 | Minami et al. |
| 7,155,780 | B2 | * | 1/2007 | Chen ........................... 16/326 |
| 7,353,568 | B2 | * | 4/2008 | Duan et al. .................... 16/326 |
| 7,359,506 | B2 | * | 4/2008 | Konja et al. ............. 379/433.13 |
| 7,506,608 | B2 | * | 3/2009 | Sato et al. ..................... 16/303 |
| 7,543,357 | B2 | * | 6/2009 | Ishikawa et al. ............... 16/303 |
| 7,711,112 | B2 | * | 5/2010 | Satoh et al. ............. 379/433.13 |

FOREIGN PATENT DOCUMENTS

| CN | 1438429 A | 8/2003 |
| JP | 2003-214423 A | 7/2003 |
| JP | 2004-150575 | 5/2004 |
| KR | 2005-0004193 A | 1/2005 |

OTHER PUBLICATIONS

South Korea Office Action for Application No. 10-2007-0121981, Oct. 28, 2009, Panasonic Corporation.

* cited by examiner

*Primary Examiner*—Angel R Estrada
(74) *Attorney, Agent, or Firm*—RatnerPrestia

(57) ABSTRACT

An opening and closing device to be used in a variety of electronic apparatuses is disclosed, and the opening and closing device can be manufactured at a low cost and ensures a positive opening/closing action. After the reversing cam moves along an axial line, a movable cam protruding on an inner wall of a ring-like movable unit elastically urges against a reversing cam. While the movable cam is held at a given angle, the movable cam elastically urges against the reversing cam and rotates, so that a stationary unit needs no stationary cam during this given angle being kept. The stationary unit thus needs the stationary cam on its outer wall only in part but not entirely. As a result, the stationary unit can be manufactured with ease by forming process.

2 Claims, 13 Drawing Sheets

OPENING AND CLOSING DEVICE

FIELD OF THE INVENTION

The present invention relates to an opening and closing device employed in a variety of electronic apparatuses such as cell phones, personal computers.

BACKGROUND OF THE INVENTION

Electronic apparatuses including cell phones and personal computers have been downsized and light-weighted in recent years, and an electronic apparatus accommodated in a double-backed housing has become popular, i.e. a movable housing is mounted to a stationary housing in a closable manner. The opening and closing device employed in such a double-backed housing thus needs to be inexpensive and positively closed or opened.

A conventional opening and closing device is described with reference to FIG. 11-FIG. 14D. Sectional views among these drawings enlarge the radial direction of a stationary cam and a movable cam for illustrating the relation between these cams more understandably.

FIG. 12 shows a sectional view of a conventional opening and closing device, and FIG. 13 shows an exploded perspective view of the conventional opening and closing device. Conventional opening and closing device 20 includes cylindrical stationary unit 1 made of metal, stationary case 2, and cylindrical stationary shaft 3. Stationary unit 1 has a pair of stationary cams 4 grooved on its entire outer wall, and stationary shaft 3 has stationary case 2 fixed at its left end as well as stationary unit 1 fixed at its center part.

Conventional opening and closing device 20 includes ring-shaped movable unit 5 made of metal and cylindrical movable case 6. Movable unit 5 has a pair of pin-shaped movable cam 7 protruding on its inner wall, and a pair of protrusions 5A protruding outward on its outer wall. Protrusions 5A are inserted into grooves 6A, so that movable unit 5 can be moved along the axial direction with respect to movable case 6, and can be rotated along the rotational direction together with movable case 6.

Movable case 6 has stationary case 2 mounted rotatably at its left end opening, and stationary section 2A of stationary case 2 protrudes leftward. Stationary shaft 3 extends through movable case 6 and its right end is rotatably mounted to an outer lateral face of movable case 6 by retaining ring 8.

Spring 9 shaping like a coil seats in somewhat compressed manner between the right lateral face of movable unit 5 and the inner wall of movable case 6. Spring 9 urges movable unit 5 toward stationary unit 1 placed on the left side. Cylindrical reversing unit 10 made of metal has reversing cam 12 at its left end, and reversing cam 12 has bumps and dips. Ring-shaped releasing unit 11 has releasing cam 13 at its right end, and cam 13 has bumps and dips. Reversing unit 11 is mounted to stationary case 2 in a movable manner along the axial direction, and releasing unit 11 is rotatably mounted to stationary case 2.

Conventional opening and closing device 20 also includes pushing unit 14 having pushing cam 15 at its right end, and cam 15 has bumps and dips. Helical spring 16 is somewhat twisted, and is anchored at its first end to releasing unit 11 and at its second end to pushing unit 14. Pushing unit 14 is mounted to the left end of stationary shaft 3 movably along the axial direction, and protrudes from stationary case 2 leftward. Opening and closing device 20 is thus constructed.

Opening and closing device 20 discussed above is, for instance, employed to a cell phone of which perspective view is shown in FIG. 11; stationary section 2A of stationary case 2 is fixed to stationary housing 22, where operating section 22A having a plurality of keys on the top face and audio-input section 22B, namely, a microphone, are formed. Movable case 6 is fixed to movable housing 23 where display section 23A such as an LCD and audio-output section 23B such as a speaker are formed.

Pushing unit 14 has push button 24 mounted thereto, and button 24 protrudes from a lateral face of stationary housing 22. Opening and closing device 20 supports movable housing 23 in a closable manner with respect to stationary housing 22, thereby forming an electronic apparatus such as the cell phone shown in FIG. 11.

In the foregoing structure, when movable housing 23 is closed with respect to stationary housing 22, opening and closing device 20 acts in the following manner: As FIG. 12 and FIG. 14A show the actions of the cams, reversing cam 12 protruding from stationary cam 4 toward movable cam 7 has a slope on its right side, and movable cam 7 elastically urges against the slope, and movable unit 5 is urged by spring 9 rightward, i.e. closing direction. Urging force along the closing direction thus acts on movable housing 23 to which movable case 6 is mounted, so that movable housing 23 can keep closing.

At this closed status, a push of button 24 placed on the lateral face of stationary housing 22 prompts pushing cam 15 of pushing unit 14, to which button 24 is mounted, to press releasing cam 13. Then releasing cam 13 rotates rightward while it compresses helical spring 16, so that releasing cam 13 gets out of the lower end of reversing cam 13 as shown in FIG. 14B, thereby moving the reversing cam 12 downward.

Movable cam 7 urged by spring 9 elastically urges against the slope on the left side of stationary cam 4 and rotates leftward, so that movable unit 5 is urged leftward, i.e. opening direction. This urging force prompts movable housing 23 to open. As shown in FIG. 14C, while movable cam 7 urged by spring 9 elastically slides on the slope on the left side of stationary cam 4 and rotates leftward, movable unit 5 and movable case 6 are urged leftward, i.e. opening direction, so that opening force is applied to movable housing 23. As a result, movable housing 23 opens at a given angle, e.g. ca. 160 degrees, with respect to stationary housing 22. At this time, a release of a finger from push button 24, namely a release of the pushing force from pushing unit 14, prompts releasing cam 13 urged by helical spring 16 to rotate leftward and push reversing cam 12 upward.

As shown in FIG. 14D, releasing cam 13 and pushing cam 15 return to their places shown in FIG. 14A, and reversing cam 12 pushed by releasing cam 13 moves upward and returns to its original place. In other words, in addition to a manual opening/closing operation of movable housing 23, a push of pushing unit 14 prompts releasing cam 13 to rotate and reversing cam 12 to move vertically, i.e. along the axial direction, whereby movable cam 7 elastically slides on stationary cam 4 for opening movable housing 23 with one-touch. As a result, a one-touch opening operation can be done.

Prior art related to the present invention is, e.g. unexamined Japanese Patent Publication No. 2004-150575.

The conventional opening and closing device discussed above; however, needs elaborate machining. To be more specific, when reversing cam 12 moves along the axial direction, movable cam 7 elastically urges against only stationary cam 4 for producing the opening force. Grooved stationary cam 4 should be thus formed almost on the entire outer wall of stationary unit 1 so that a pair of movable cams 7 formed on the inner wall of movable unit 5 can elastically slide on grooved stationary cam 4. As a result, the elaborate machining, which takes time, is required for manufacturing the stationary unit 1, and it results in an expensive mechanism.

SUMMARY OF THE INVENTION

The present invention addresses the problem discussed above, and aims to provide an opening and closing device which can be manufactured at a low cost and can carry out a positive opening/closing action. The opening and closing device of the present invention is formed as follows: A movable cam protruding from the inner wall or the outer wall of a ring-shaped movable unit elastically urges to a reversing cam after the reversing cam moves. When a reversing unit moves along an axial direction, it elastically urges to the reversing cam and rotates simultaneously while the movable cam stays at a given angle. A stationary cam is thus not needed during the movable cam staying at this given angle, so that the stationary unit needs the stationary cam on the outer wall, only in part but not entire part, of the stationary unit. The stationary unit can be thus manufactured rather easily by forming process. As a result, the opening and closing device can be manufactured at a low cost and its opening/closing action can be ensured.

The present invention thus obtains an opening and closing device that can be manufactured at a low cost and carry out a positive opening/closing action.

DETAILED DESCRIPTION OF PREFERRED EMBODIMENTS

Exemplary embodiments of the present invention are demonstrated hereinafter with reference to the accompanying FIG. 1-FIG. 11. In these drawings, sectional views show enlarged dimensions along the radial direction in order to illustrate the relation between a stationary cam and a movable cam more understandable. Similar elements to those described in the background of the invention have the same reference marks, and detailed descriptions thereof are simplified here.

Exemplary Embodiment 1

Figure 1:
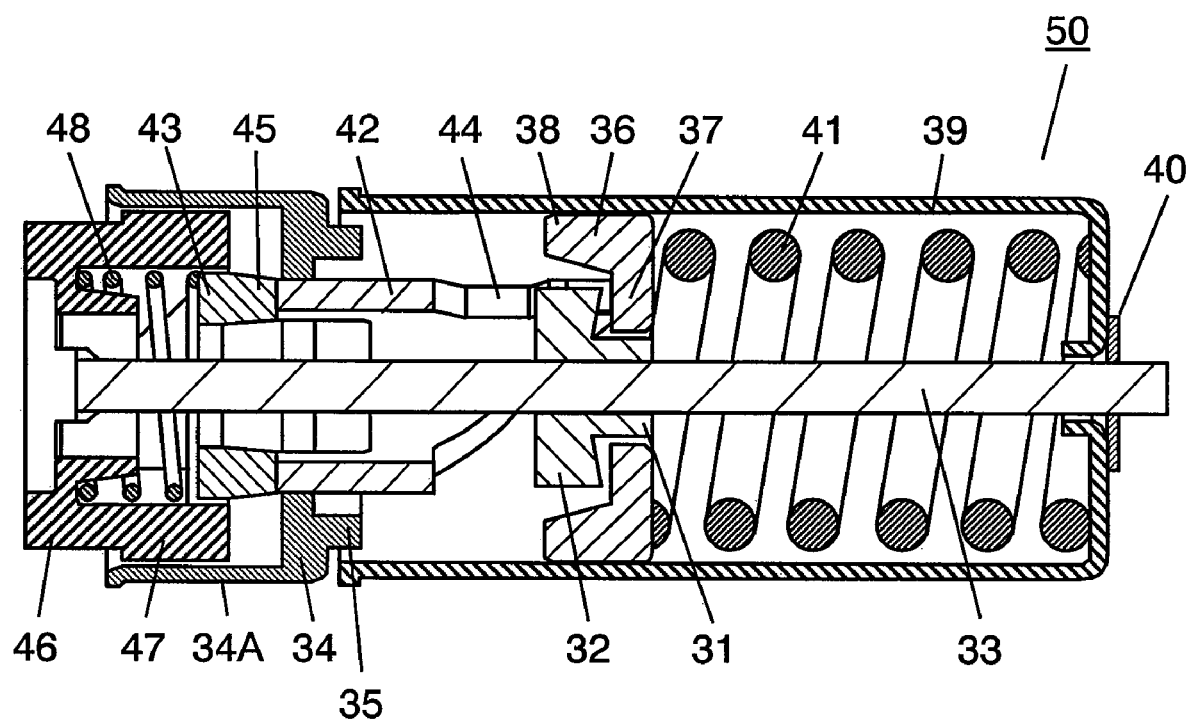
FIG. 1 shows a sectional view of an opening and closing device in accordance with a first embodiment of the present invention.
Figure 2:
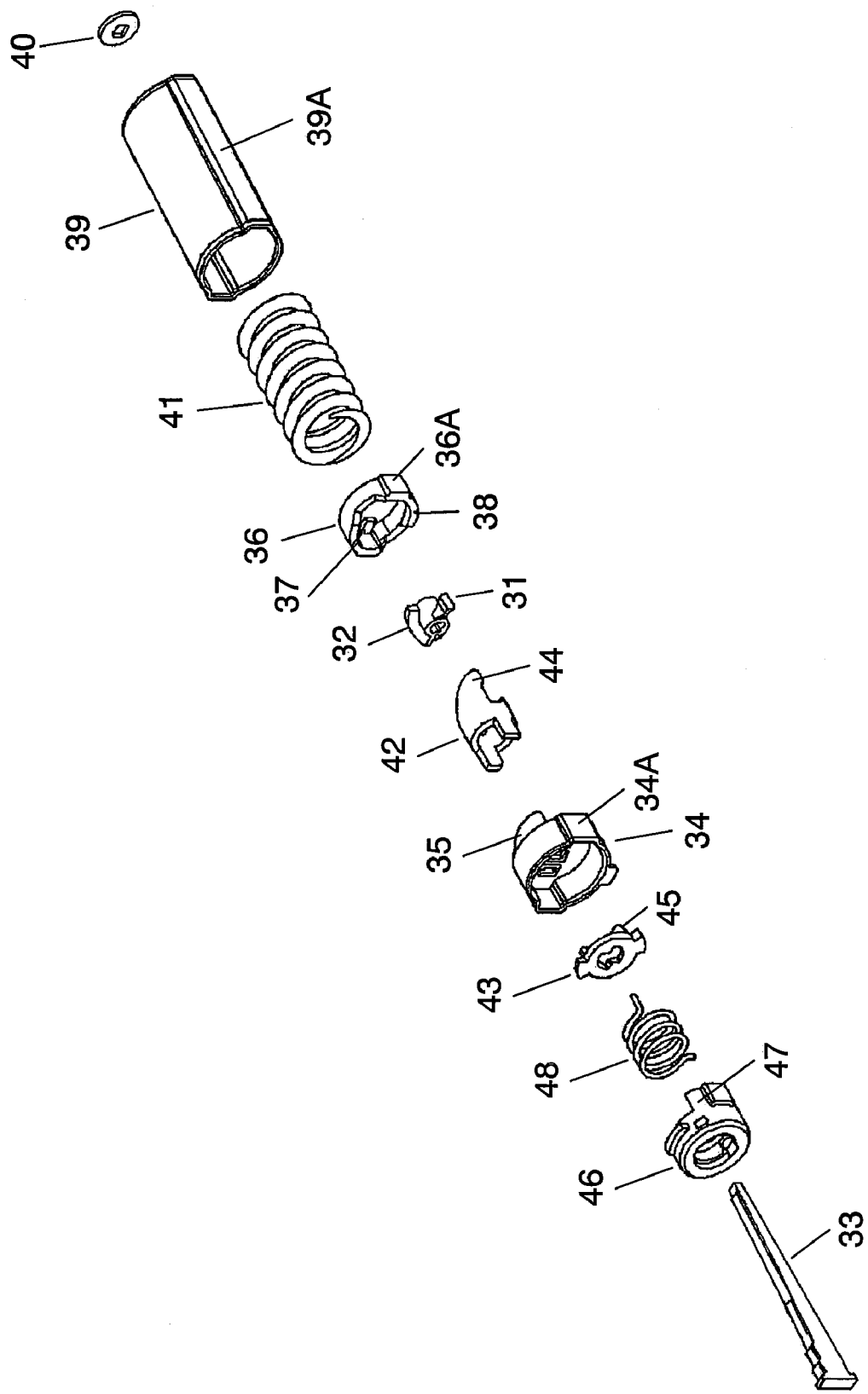
FIG. 2 shows an exploded perspective view of the opening and closing device.
Figure 3:
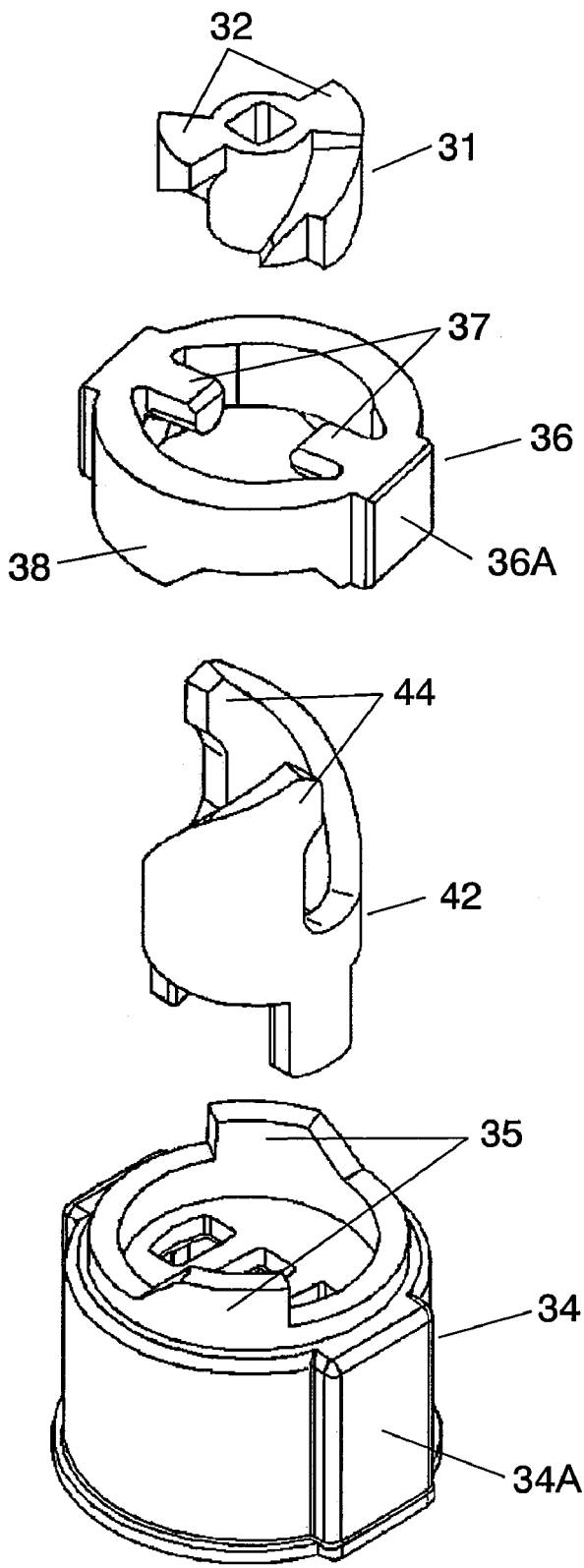
FIG. 3 shows an exploded perspective view illustrating an essential part of the opening and closing device.

FIG. 1 shows a sectional view of opening and closing device 50 in accordance with the first embodiment of the present invention. FIG. 2 shows an exploded perspective view of opening and closing device 50. FIG. 3 shows an exploded perspective view illustrating an essential part of opening and closing device 50. Cylindrical stationary unit 31 made of metal, such as steel, copper alloy or sintered alloy, has a pair of stationary cams 32 formed on its outer wall. Cams 32 partially protrude outward.

Stationary case 34 made of metal has a pair of bumpy auxiliary cams 35 formed on the outer wall of its right end. Stationary shaft 33 made of metal has stationary unit 31 rigidly mounted at its center section, and stationary case 34 rigidly mounted at its left end. Ring-shaped movable unit 36 made of metal is placed such that it can rotate along the opening/closing direction with respect to stationary unit 31 and move along the axial direction. A pair of pin-shaped movable cams 37 protrudes from the inner wall of movable unit 36, and a pair of bumpy auxiliary cams 38 is formed on the outer wall of the left end of movable unit 36.

Cylindrical movable case 39 made of metal has a pair of grooves 39A on its outer wall, and a pair of protrusions 36A protruding from movable unit 36 is inserted into grooves 39A, so that movable unit 36 can move along the axial direction with respect to movable case 39, and movable unit 36 can rotate along the rotating direction together with movable case 39.

Stationary case 34 is rotatably mounted to an opening of the left end of movable case 39, and stationary section 34A protrudes leftward. Stationary shaft 33 extends through movable case 39, and its right end is held by retaining ring 40 on an outer lateral face of movable case 39 such that shaft 33 can rotate.

Coil spring 41 made of steel wire seats in somewhat compressed manner between the right lateral face of movable unit 36 and the inner wall of movable case 39, and spring 41 urges movable unit 36 toward stationary unit 31 placed leftward.

Cylindrical reversing unit 42 made of metal has a pair of bumpy reversing cams 44 at its right end, and ring-shaped releasing unit 43 has bumpy releasing cam 45 at its right end. Reversing unit 42 and releasing unit 43 are mounted to stationary case 34 such that reversing unit 42 is movable along the axial direction, and releasing unit 43 is rotatable.

Pushing unit 46 has bumpy pushing cam 47 at its right end, and helical spring 48 is anchored in somewhat compressed manner to releasing unit 43 at its first end and to pushing unit 46 at its second end. Pushing unit 46 is mounted to the left end of stationary shaft 33 such that pushing unit 46 can move along the axial direction, and it protrudes leftward from stationary case 34. Opening and closing device 50 is thus constructed.

Figure 11:
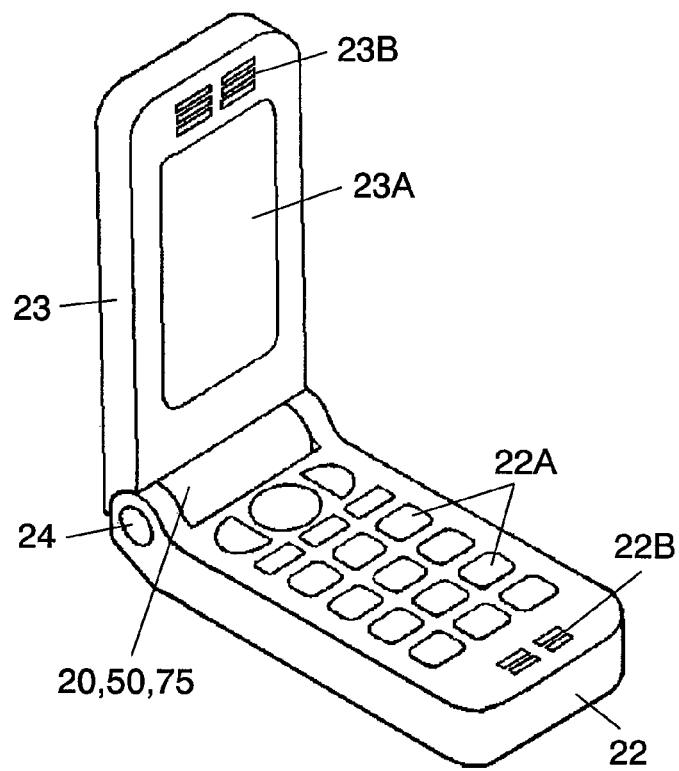
FIG. 11 shows a perspective view of a cell phone.
Figure 12:
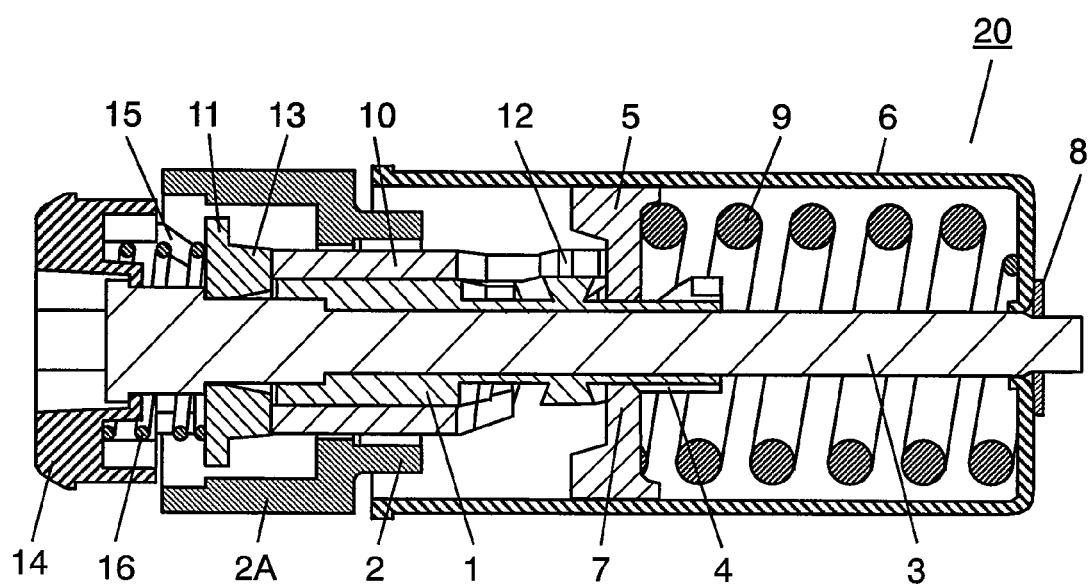
FIG. 12 shows a sectional view of a conventional opening and closing device.
Figure 13:
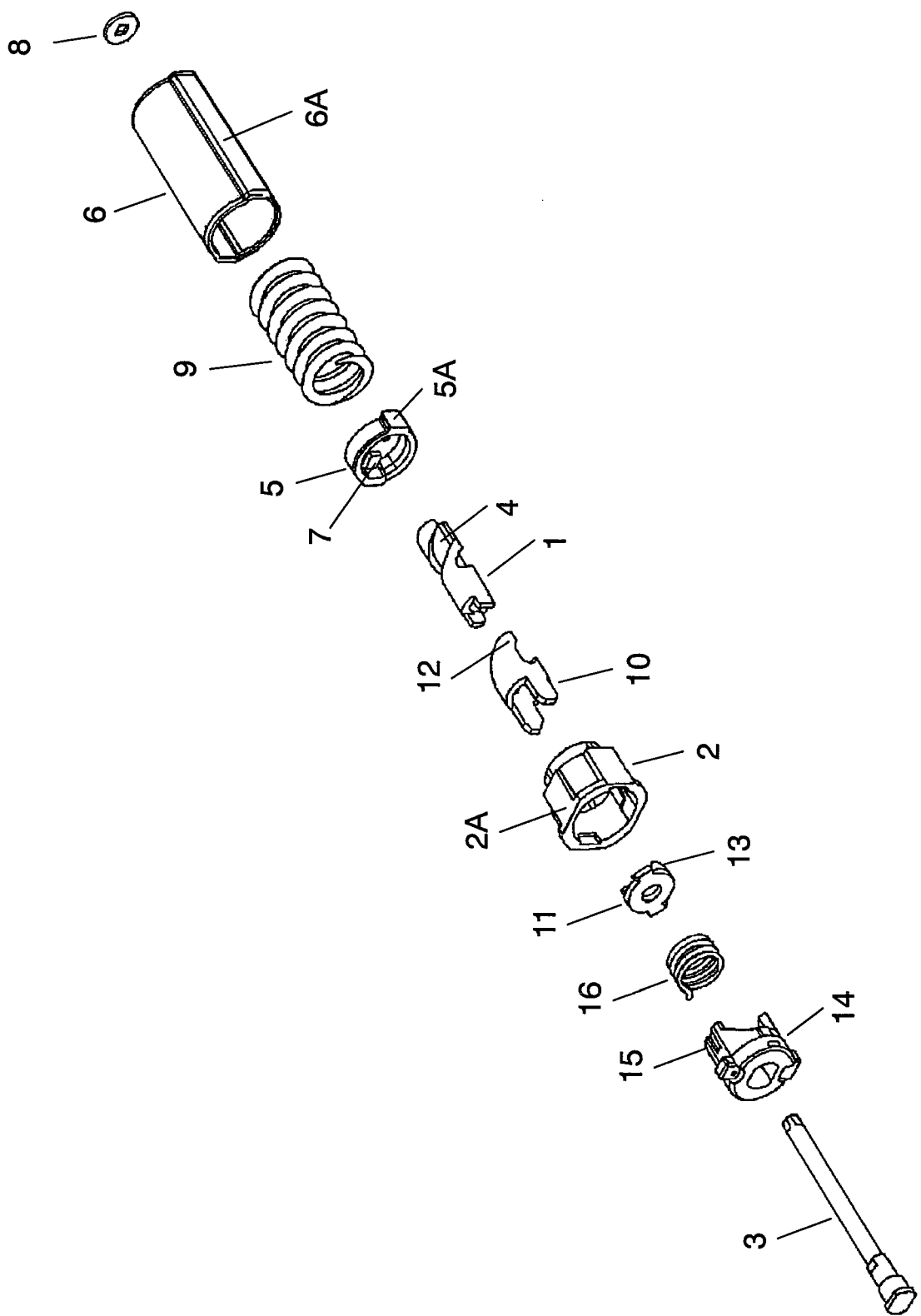
FIG. 13 shows an exploded perspective view of the conventional opening and closing device.
Figure 14A:
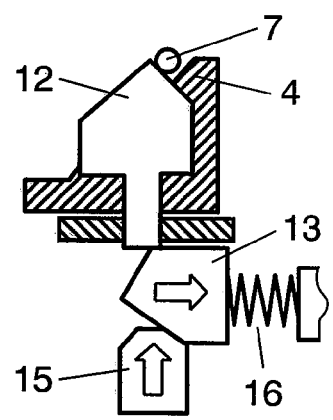
FIG. 14A shows a first action of cams used in the conventional opening and closing device.
Figure 14B:
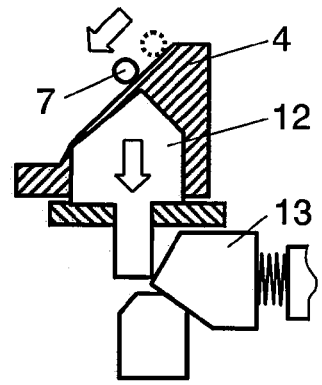
FIG. 14B shows a second action of cams used in the conventional opening and closing device.
Figure 14C:
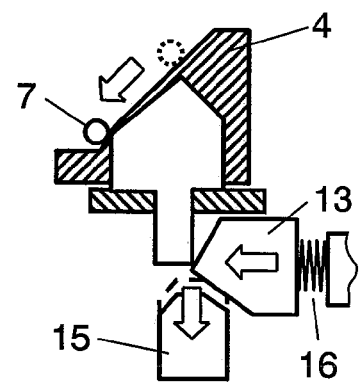
FIG. 14C shows a third action of cams used in the conventional opening and closing device.
Figure 14D:
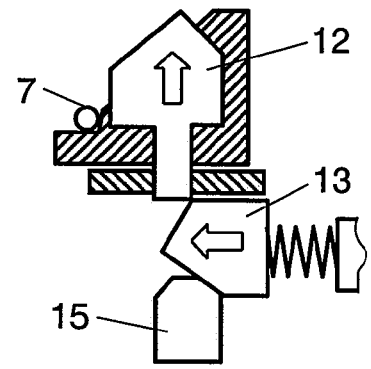
FIG. 14D shows a fourth action of cams used in the conventional opening and closing device.

Opening and closing device 50 discussed above is, for instance, employed to a cell phone of which perspective view is shown in FIG. 11; stationary section 34A of stationary case 34 is fixed to stationary housing 22, where operating section 22A having a plurality of keys on the top face and audio-input section 22B, namely, a microphone, are formed. Movable case 39 is fixed to movable housing 23, where display section 23A such as an LCD and audio-output section 23B such as a speaker are formed.

Pushing unit 46 has push button 24 mounted thereto, and button 24 protrudes from a lateral face of stationary housing 22. Opening and closing device 50 supports movable housing 23 with the shaft in a closable manner with respect to stationary housing 22, thereby forming an electronic apparatus.

Figure 4A:
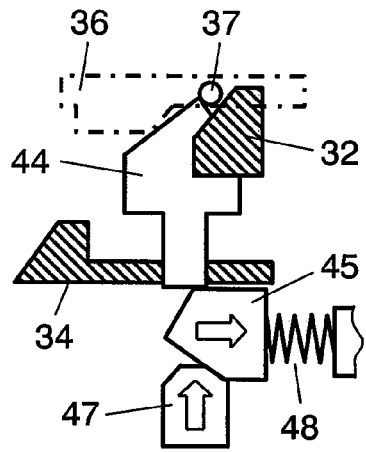
FIG. 4A shows a first action of cams used in the opening and closing device.
Figure 5A:
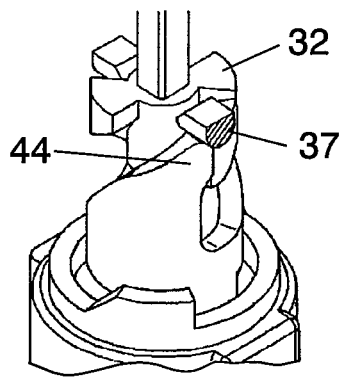
FIG. 5A shows a perspective view of a first essential part of the cams.

In the foregoing structure, when movable housing 23 is closed with respect to stationary housing 22, opening and closing device 50 acts as follows: As FIG. 4A shows the actions of the cams and FIG. 5A shows an essential part of the perspective view, reversing cam 44 protruding from stationary cam 32 toward movable cam 37 has a slope on its right side, and movable cam 37 elastically urges against the slope, and movable unit 36 is urged by spring 41 rightward, i.e. closing direction. The urging force along the closing direction thus acts on movable housing 23 to which movable case 39 is mounted, so that movable housing 23 can keep closing.

At this closed status, a push of button 24 placed on the lateral face of stationary housing 22 prompts pushing cam 47 of pushing unit 46, to which button 24 is mounted, to press releasing cam 45. Then releasing cam 45 rotates rightward while it compresses helical spring 48, so that releasing cam 45 gets out of the lower end of reversing cam 44, thereby moving the reversing cam 44 downward.

Figure 4D:
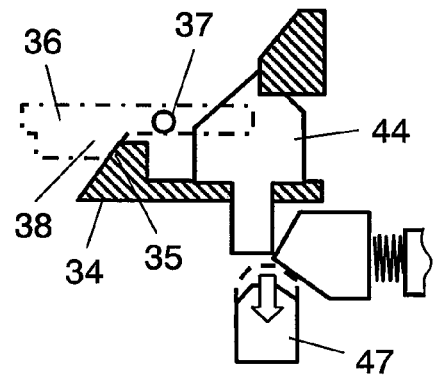
FIG. 4D shows a fourth action of the cams used in the opening and closing device.
Figure 4B:
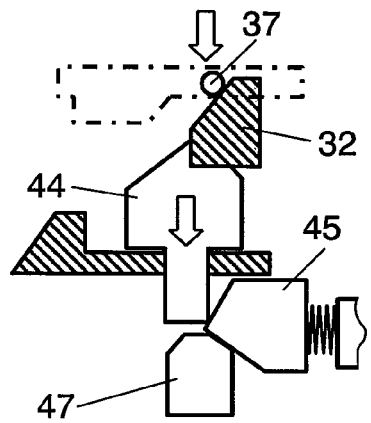
FIG. 4B shows a second action of the cams used in the opening and closing device.
Figure 5D:
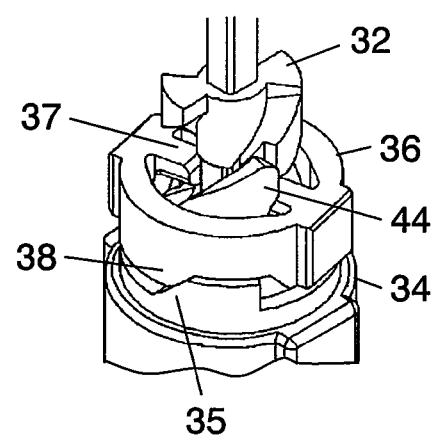
FIG. 5D shows a perspective view of a fourth essential part of the cams.
Figure 5B:
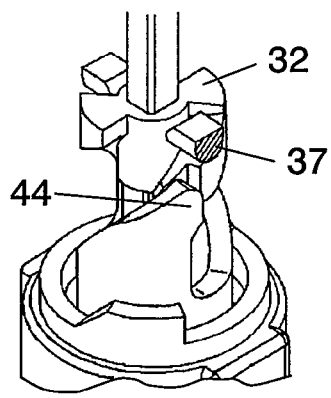
FIG. 5B shows a perspective view of a second essential part of the cams.

As shown in FIGS. 4B and 5B, movable cam 37 urged by spring 41 elastically urges against the slope on the left side of stationary cam 32 and rotates leftward, so that movable unit 36 is urged leftward, i.e. along the opening direction. This urging force prompts movable housing 23 to open.

Figure 4E:
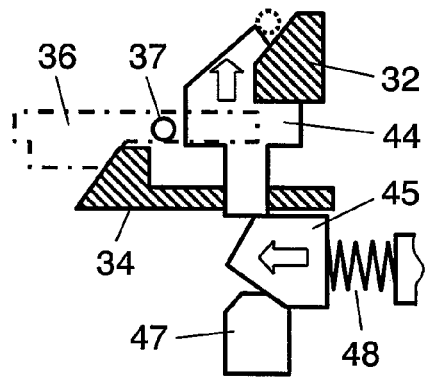
FIG. 4E shows a fifth action of the cams used in the opening and closing device.
Figure 4C:
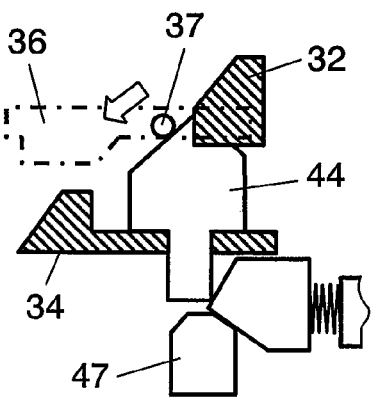
FIG. 4C shows a third action of the cams used in the opening and closing device.
Figure 5E:
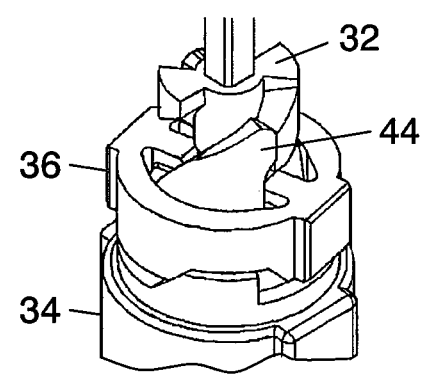
FIG. 5E shows a perspective view of a fifth essential part of the cams.
Figure 5C:
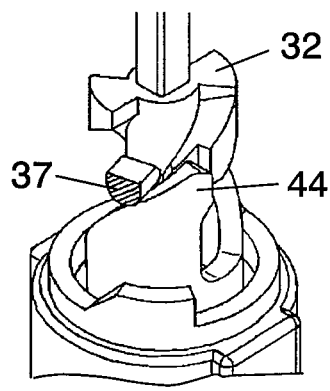
FIG. 5C shows a perspective view of a third essential part of the cams.

Then as shown in FIGS. 4C and 5C, movable cam 37 urged by spring 41 elastically urges against the slope on the left side of reversing cam 44 instead of stationary cam 32, and elastically slides on this slope and rotates leftward. During this action, movable unit 36 and movable case 39 are urged leftward, i.e. opening direction, so that the force along the opening direction is kept applying to movable housing 23.

When movable housing 23 opens at a given angle, e.g. ca. 160 degrees, with respect to stationary housing 22, auxiliary cam 38 of movable unit 36 elastically urges against auxiliary cam 35 of stationary case 34 as shown in FIGS. 4D and 5D, so that movable unit 36 stops its rotating action.

At this time, a release of a finger from push button 24, namely, a release of pushing force from pushing unit 46, prompts pushing cam 47 to move, and releasing cam 45 urged by helical spring 48 rotates leftward and pushes reversing cam 44 upward as shown in FIGS. 4E and 5E. Reversing cam 44 thus moves upward and returns to its original place. Releasing cam 45 and pushing cam 47 also return to their original places simultaneously.

A stopper mechanism (not shown) is provided between movable housing 23 and stationary housing 22 so that movable housing 23 can be kept holding at ca. 160 degrees, in which posture a user can place a phone call with ease using audio input section 22B and audio output section 23B.

To be more specific, in addition to a manual opening/closing operation of movable housing 23, a push of pushing unit 46 prompts releasing cam 45 to rotate and reversing cam 44 to move vertically, i.e. along the axial direction, thereby opening movable housing 23 with one-touch. As a result, a one-touch opening operation can be done.

When reversing cam 44 moves along the axial direction, movable cam 37 elastically slides on the slope formed on the left side of reversing cam 44 instead of stationary cam 32 as shown in FIGS. 4C and 5C, and rotates leftward during the given angle being kept, so that stationary unit 31 needs no stationary cam, 32 while the given angle is kept. In other words, as shown in FIGS. 2 and 3, stationary cam 32 can be formed on the outer wall of stationary unit 31 in part but not entirely, and the shape of cam 32 protrudes outward. Thus stationary unit 31 can be formed with ease by sinter forming or press working at a low cost, and needs no elaborate machining. Movable cam 37 is elastically urged against reversing cam 44, whereby positive opening/closing action can be expected.

As discussed above, move the reversing cam 44 along the axial direction, then elastically urge the movable cam 37, protruding from the inner wall of ring-shaped movable unit 36, against reversing cam 44, thereby rotating movable cam 37 during the given angel being kept while movable cam 37 elastically urges against reversing cam 44. Stationary unit 31 thus needs no stationary cam 32 during the given angle being kept, so that stationary cam 32 can be formed on the outer wall of stationary unit 31 in part but not entirely. Thus stationary unit 31 can be formed by forming process with ease at a low cost, and needs no elaborate machining, and a positive opening/closing action can be expected.

Auxiliary cams 35 and 38, as discussed previously, are formed on the outer walls of stationary case 34 and movable unit 36 respectively so that cam 35 elastically urges against cam 38 when movable housing 23 opens at ca. 160 degrees with respect to stationary housing 22. This structure allows the elastic urging torque of movable unit 36 urged by spring 41 to be greater within a limited space than a case where cams 35 and 38 are formed inside instead of outside, so that a more positive opening/closing action can be expected.

Exemplary Embodiment 2

In the second embodiment, similar elements to those in the first embodiment have the same reference marks, and the detailed descriptions thereof are omitted here.

Figure 6:
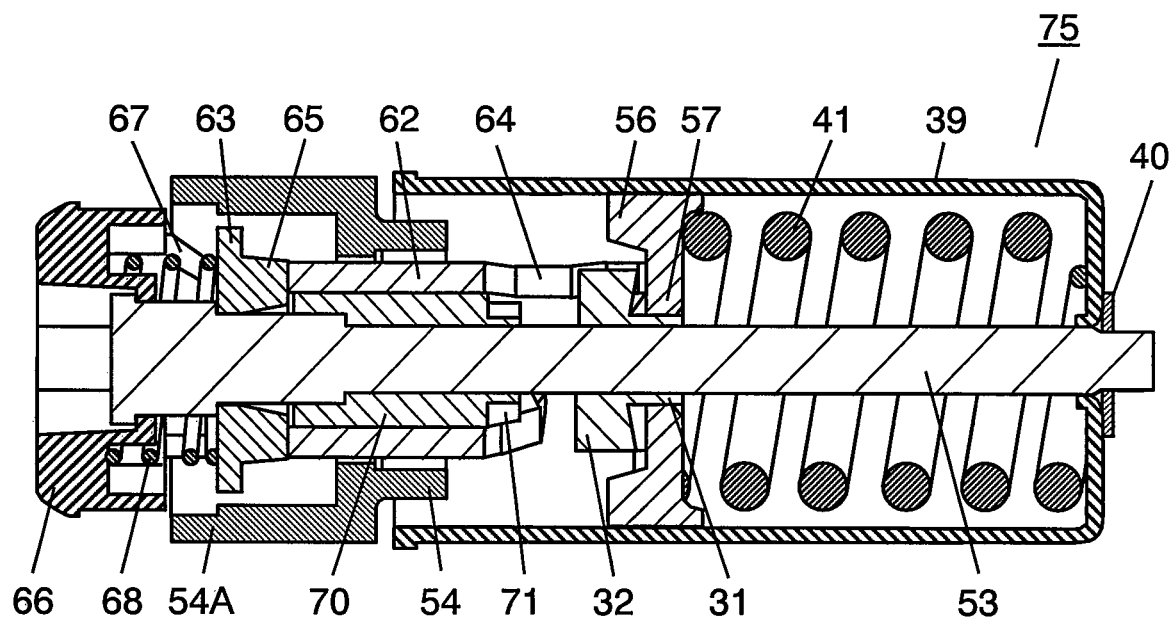
FIG. 6 shows a sectional view of an opening and closing device in accordance with a second embodiment of the present invention.
Figure 7:
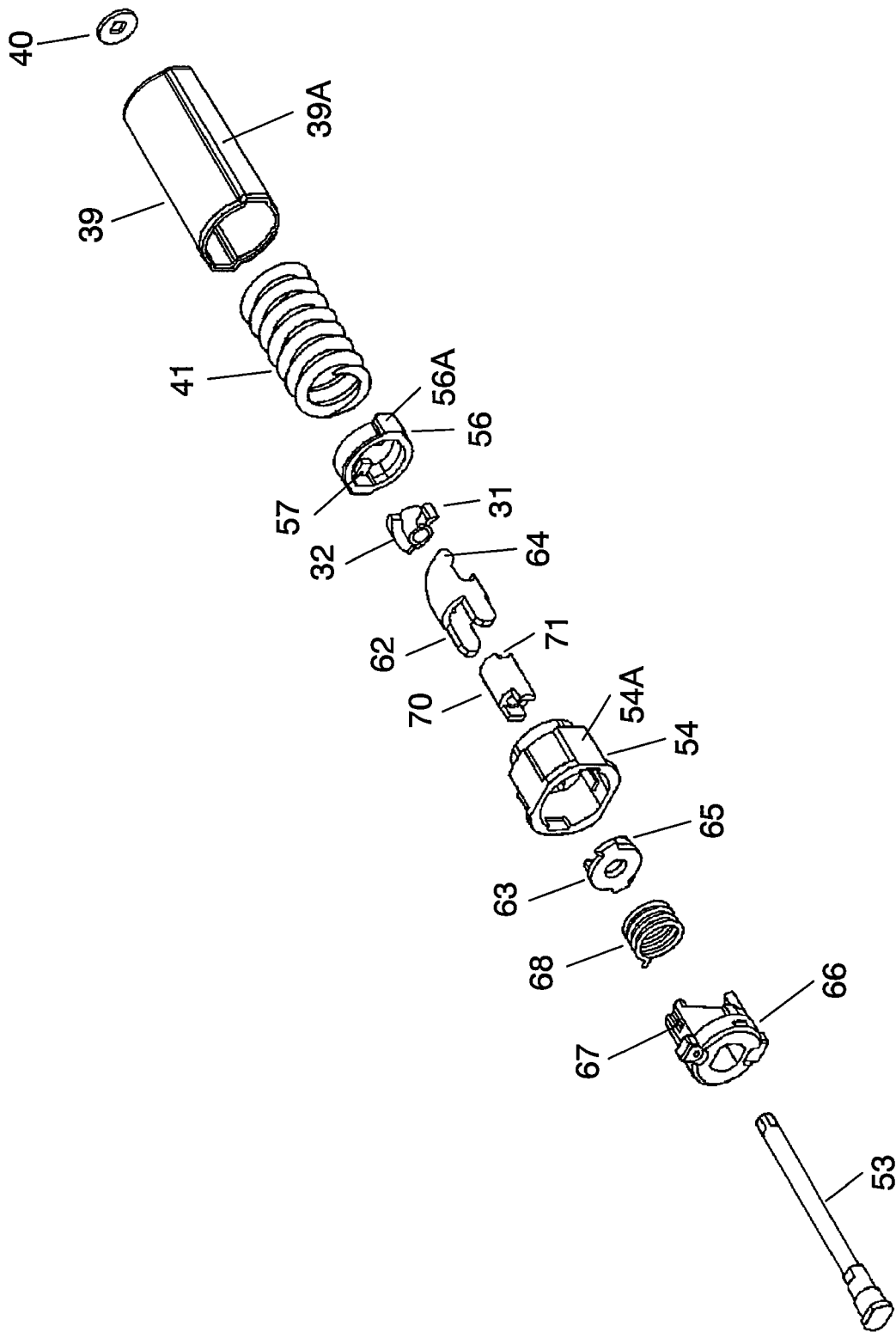
FIG. 7 shows an exploded perspective view of the opening and closing device shown in FIG. 6.
Figure 8:
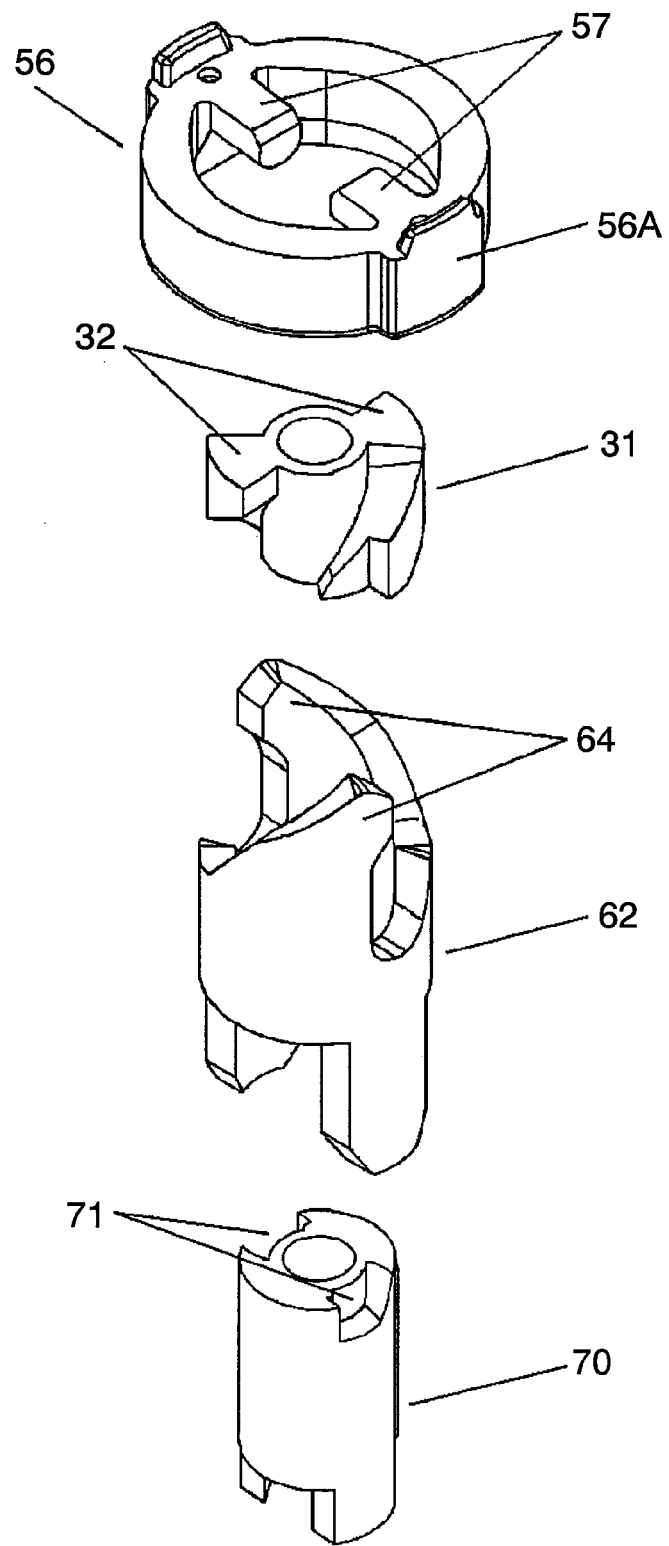
FIG. 8 shows an exploded perspective view illustrating an essential part of the opening and closing device shown in FIG. 6.

FIG. 6 shows a sectional view of opening and closing device 75 in accordance with the second embodiment of the present invention. FIG. 7 shows an exploded perspective view of the opening and closing device, and FIG. 8 shows an exploded perspective view illustrating an essential part of the opening and closing device. As shown in these drawings, cylindrical stationary unit 31 made of metal has a pair of stationary cam 32 protruding on its outer wall in part, and cylindrical stationary shaft 53 has stationary unit 31 stationary at its center part and stationary case 54 fixed at its left end. These structures remain unchanged from the first embodiment; however, stationary case 54 has no auxiliary cam.

Ring-like movable unit 56 made of metal is placed such that it can rotate along the opening/closing direction with respect to stationary unit 31, and be movable along the axial direction. A pair of pin-like movable cams 57 protrudes on the inner wall of movable unit 56. These structures remain unchanged from the first embodiment; however, movable unit 56 has no auxiliary cam too.

Cylindrical movable case 39 made of metal has a pair of grooves 39A on its outer wall, and a pair of protrusions 56A protruding on the outer wall of movable unit 56 is inserted into grooves 39A so that movable unit 56 can move along the axial direction with respect to movable case 39, and rotates together with movable case 39. Movable case 39 has stationary case 54 mounted rotatably at the opening on its left end, and stationary section 54A protrudes leftward. These structures remain unchanged from the first embodiment.

Stationary shaft 53 extends through movable case 39, and its right end is held by retaining ring 40 on an outer lateral face of movable case 39 such that shaft 33 can rotate. Coil spring 41 made of steel wire seats in somewhat compressed manner between the right lateral face of movable unit 36 and the inner wall of movable case 39, and spring 41 urges movable unit 36 toward stationary unit 31 placed leftward. These structures also remain unchanged from the first embodiment.

Reversing unit 62 has a pair of bumpy reversing cams 64 at its right end, and releasing unit 63 has bumpy releasing cam 65 at its right end. Reversing unit 62 and releasing unit 63 are mounted to stationary case 54 such that reversing unit 62 is movable along the axial direction, and releasing unit 63 is rotatable. Helical spring 68 is anchored in somewhat compressed manner at its first end to pushing unit 66 of which right end has bumpy pushing cam 67, and at its second end to releasing unit 63. Pushing unit 66 is mounted to the left end of stationary shaft 53 such that pushing unit 66 can move along the axial direction, and it protrudes leftward from stationary case 54. These structures also remain unchanged from the first embodiment.

Cylindrical auxiliary unit 70 made of metal has a pair of recessed auxiliary cams 71 at its right end, and auxiliary unit 70 is fixed to stationary case 54. Opening and closing device 75 is thus constructed.

To be more specific, in this second embodiment, auxiliary unit 70 having auxiliary cams 71 is additionally provided, whereby stationary case 54 and movable unit 56 need no auxiliary cams. As a result, these structural elements can be simpler forms.

Opening and closing device 75 discussed above, for instance, is used as shown in a perspective view in FIG. 11; stationary section 54A of stationary case 54 is fixed to stationary housing 22, and movable case 39 is fixed to movable housing 23. Pushing unit 66 has push button 24 mounted thereto, and opening and closing device 75 supports movable housing 23 with shaft in a closable manner with respect to stationary housing 22, thereby forming an electronic apparatus.

Figure 9A:
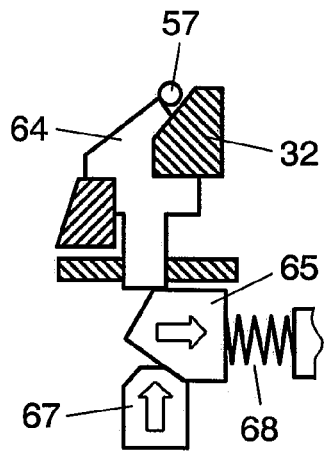
FIG. 9A shows a first action of cams used in the opening and closing device shown in FIG. 6.
Figure 10A:
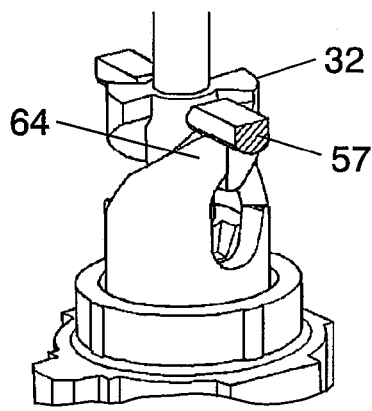
FIG. 10A shows a first essential part of the opening and closing device shown in FIG. 6.

In the foregoing structure, when movable housing 23 is closed with respect to stationary housing 22, opening and closing device 75 acts in the following manner: as FIG. 9A shows actions of the cams and FIG. 10A shows an essential part of the perspective view, reversing cam 64 protruding from stationary cam 32 toward movable cam 57 has a slope on its right side, and movable cam 57 elastically urges against the slope, and movable unit 56 is urged by spring 41 rightward, i.e. along the closing direction. The urging force along the closing direction thus acts on movable housing 23, to which movable case 39 is mounted, so that movable housing 23 can keep closing.

Figure 9D:
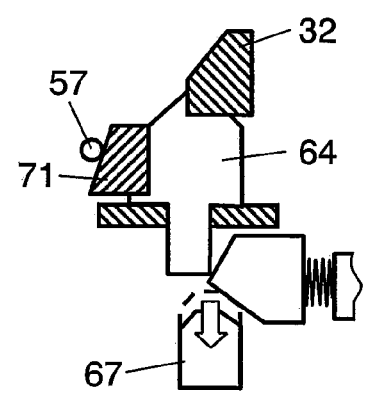
FIG. 9D shows a fourth action of the cams used in the opening and closing device shown in FIG. 6.
Figure 9B:
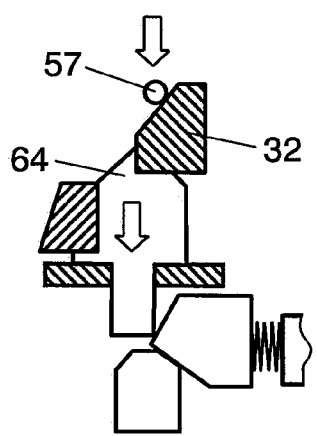
FIG. 9B shows a second action of the cams used in the opening and closing device shown in FIG. 6.

At this closed status, a push of button 24 placed on the lateral face of stationary housing 22 prompts pushing cam 67 of pushing unit 66, to which button 24 is mounted, to press releasing cam 65. Then releasing cam 65 rotates rightward while it compresses helical spring 68, so that releasing cam 65 gets out of the lower end of reversing cam 64, thereby moving the reversing cam 64 downward as shown in FIG. 9B and FIG. 10B, and movable cam 57 urged by spring 41 elastically urges against the slope on the left side of stationary cam 32 and rotates leftward, so that movable unit 56 is urged leftward, i.e. along the opening direction. This urging force prompts movable housing 23 to open.

Figure 9E:
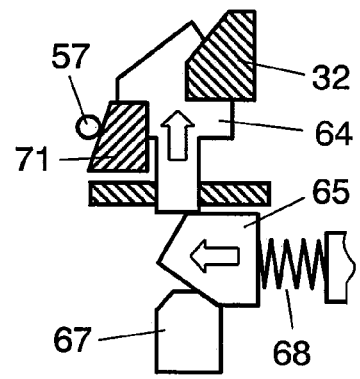
FIG. 9E shows a fifth action of the cams used in the opening and closing device shown in FIG. 6.
Figure 9C:
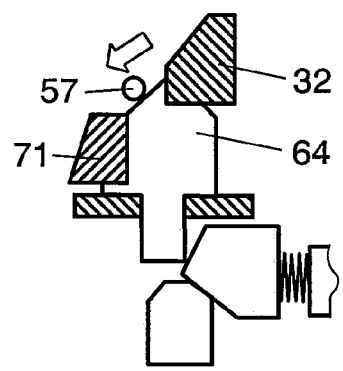
FIG. 9C shows a third action of the cams used in the opening and closing device shown in FIG. 6.
Figure 10D:
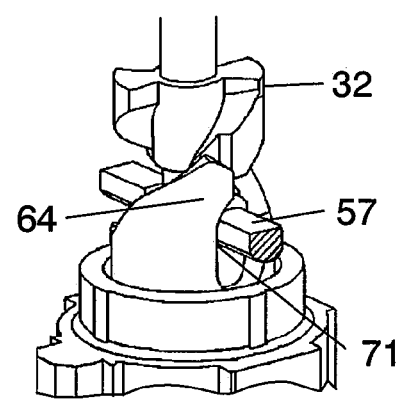
FIG. 10D shows a fourth essential part of the opening and closing device shown in FIG. 6.
Figure 10B:
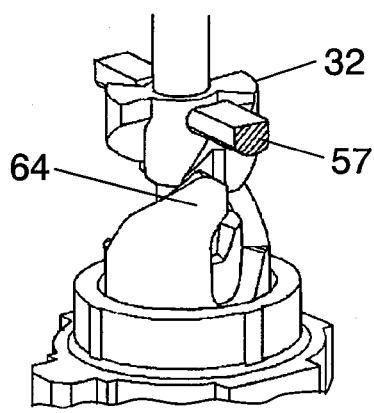
FIG. 10B shows a second essential part of the opening and closing device shown in FIG. 6.
Figure 10E:
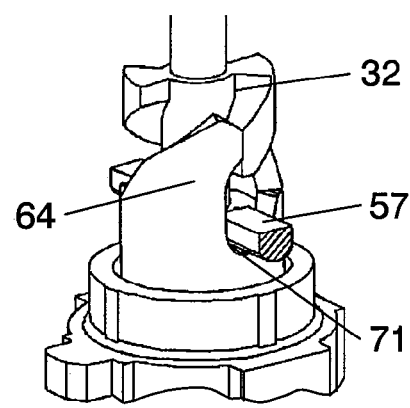
FIG. 10E shows a fifth essential part of the opening and closing device shown in FIG. 6.
Figure 10C:
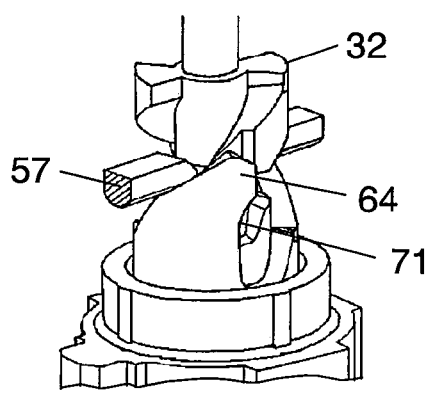
FIG. 10C shows a third essential part of the opening and closing device shown in FIG. 6.

Then as shown in FIGS. 9C and 10C, movable cam 57 urged by spring 41 elastically urges against the slope on the left side of reversing cam 64 instead of stationary cam 32, and elastically slides on this slope and rotates leftward. During this action, movable unit 56 and movable case 39 are urged leftward, i.e. along the opening direction, so that the force along the opening direction is kept applying to movable housing 23.

When movable housing 23 opens at a given angle, e.g. ca. 160 degrees, with respect to stationary housing 22, movable cam 57 elastically urges against auxiliary cam 71 of auxiliary unit 70 as shown in FIGS. 9D and 10D, so that movable unit 56 stops its rotating action.

At this time, a release of a finger from push button 24, namely, a release of pushing force from pushing unit 66, prompts pushing cam 67 to move, and releasing cam 65 urged by helical spring 68 rotates leftward and pushes reversing cam 64 upward as shown in FIGS. 9E and 10E. Reversing cam 64 thus moves upward and returns to its original place. Releasing cam 65 and pushing cam 67 also return to their original places simultaneously.

To be more specific, in addition to a manual opening/closing operation of movable housing 23, a push of pushing unit 66 prompts releasing cam 65 to rotate and reversing cam 64 to move vertically, i.e. along the axial direction, thereby opening movable housing 23 with one-touch. As a result, a one-touch opening operation can be done.

In this second embodiment, when reversing cam 64 moves along the axial direction, movable cam 57 elastically slides on reversing cam 64 instead of stationary cam 32 as shown in FIGS. 9C and 10C, and rotates leftward during the given angle being kept, so that stationary unit 31 needs no stationary cam 32 while movable cam 57 rotates leftward. In other words, as shown in FIGS. 7 and 8, stationary cam 32 can be formed on the outer wall of stationary unit 31 in part but not entirely, and the shape of cam 32 protrudes outward. Thus stationary unit 31 can be formed with ease.

As discussed in this second embodiment, move the reversing cam 64 along the axial direction, then elastically urge the movable cam 57, protruding from the inner wall of movable unit 56, against reversing cam 64. Stationary unit 31 thus needs no stationary cam 32, so that stationary cam 32 can be formed on the outer wall in part but not entirely, of stationary unit 31. Thus stationary unit 31 can be formed by forming process with ease at a low cost, and a positive opening/closing action can be expected.

Auxiliary unit 70 having auxiliary cams 71 is provided, whereby stationary case 54 and movable unit 56 need no auxiliary cam. As a result, these structural elements can be formed in simpler shapes.

Although the structure becomes rather complicated, auxiliary unit 70 can be formed unitarily with stationary case 54, then the number of structural elements does not increase, and the opening and closing device can be constructed at a lower cost.

In the previous descriptions, movable cams 37 and 57 protrude and confront each other on the inner wall of movable units 36 and 56 respectively; however, a pair of movable cams protruding outward is formed on the outer wall of the movable unit, and a stationary cam is formed on the inner wall or the right end of stationary unit 31, and then the movable cams can elastically urge against the stationary cam. This structure is also applicable to the present invention.

The opening and closing device of the present invention can be manufactured at a low cost, and ensures a positive opening/closing action, so that it is useful to a variety of electronic apparatuses.

What is claimed is:

1. An opening and closing device comprising:
   a cylindrical stationary unit having a stationary cam at one of an outer wall, inner wall, and an end of the stationary unit;
   a ring-shaped movable unit disposed so as to rotate in an opening direction or a closing direction with respect to the stationary unit, and having movable cam protruding on one of an inner wall and an outer wall of the movable unit;
   a spring for urging the movable cam toward the stationary cam; and
   a cylindrical reversing unit disposed movably along an axial direction, and having a reversing cam formed on its face confronting the movable cam,
   wherein when the reversing cam moves along a direction apart from the movable unit while the movable cam elastically urges against the reversing cam and the movable unit is urged along the closing direction by spring, the movable cam elastically urges against the stationary cam and the movable cam rotates along the opening direction so that the movable unit rotates along the opening direction, and
   after the movable cam elastically urges against the stationary cam and rotates along the opening direction, the movable cam elastically urges against the reversing cam and the movable cam rotates along the opening direction so that the movable unit rotates along the opening direction.

2. The opening and closing device of claim 1, wherein the reversing cam includes a slope, and after the movable cam elastically urges against the stationary cam and the movable cam rotates along an opening direction, the movable cam elastically urges against the slope of the reversing cam;
   wherein the movable cam, elastically urging against the slope of the reversing cam, moves on the slope while rotating along the opening direction by means of urging force of the spring, and this rotation prompts the movable unit to rotate along the opening direction with respect to the stationary unit.

* * * * *